Oct. 13, 1953     D. L. NEWTON     2,655,209
OIL BURNER
Filed April 7, 1950
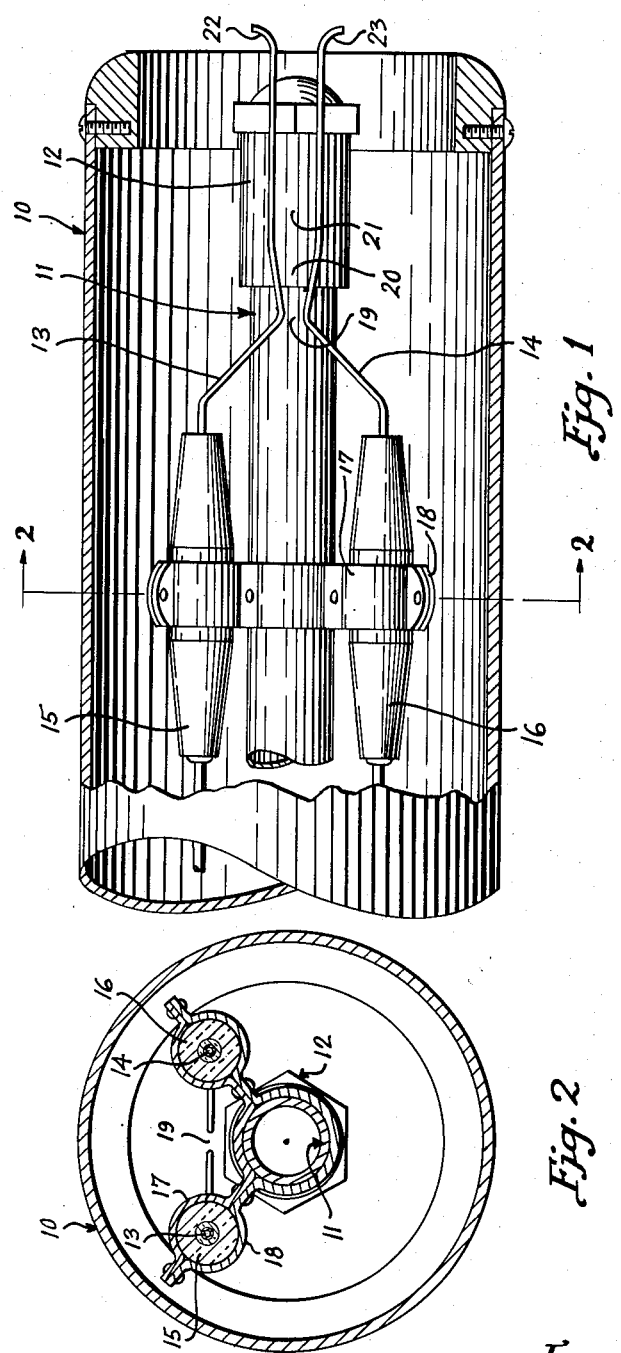
Inventor
DAVID L. NEWTON
By: Fetherstonhaugh &Co.
Att'ys

Patented Oct. 13, 1953

2,655,209

UNITED STATES PATENT OFFICE 2,655,209

OIL BURNER

David L. Newton, Niagara Falls, Ontario, Canada

Application April 7, 1950, Serial No. 154,489

3 Claims. (Cl. 158—28)

This invention relates generally to oil burners, and more particularly to an electrode for automatic electrical ignition of oil burners. The present application is a continuation in part of application Serial Number 62,263 filed by me on November 27, 1948, and now abandoned.

The automatic electric ignition of oil burners by means of two electrodes separated by an arc gap located in the combustion area of the burner has been widely used. In many cases the electrodes are point electrodes. These electrodes are subject to the disadvantage that the arc produced across them may not be located in the best possible igniting position to ignite the oil vapor mixture produced by the burner under many conditions of operation. They are subject to the further disadvantage that the points soot up and, if located too closely together, will cause a short circuit. Attempts have been made to get over the first difficulty by providing electrodes which diverge from the arc gap. After the arc strikes across the gap it is carried along by the diverging electrodes to provide a wider igniting zone. No one has yet though devised an electrode which overcomes the difficulty of preventing the electrodes from sooting up at the arc gap when an attempt is made to narrow the arc gap. The narrowing of the arc gap has, of course, substantial advantage because it permits the burner to operate and ignite on a much lower voltage. This is desirable because the equipment to produce the lower voltage is cheaper and there is not the same need for expensive current limiting devices after the arc is struck.

It is an object of my invention to provide ignition electrodes for an oil burner with which the striking arc can be made relatively short.

It is a further object of the invention to provide a pair of igniting electrodes for an oil burner which will provide ignition over a substantial area in the combustion zone of the burner.

My burner has a forced air conduit with an open discharge end and an oil supply pipe rigidly mounted therein to inject oil into an air stream as it is forced through the conduit adjacent the discharge end thereof similar to the standard burner. My invention relates to the igniting electrodes employed with such a burner and comprises the improvement of a pair of elongated electrodes rigidly mounted in the air conduit and formed to approach each other to form an arc gap, then to separate from each other to form an arc transmitting portion, and then to diverge sharply at their free ends to extinguish the arc in operation. The electrodes are mounted within the air conduit to locate the arc gap in an air stream travelling through the pipe in advance of the area of discharge of the oil nozzle and to locate at least a portion of the arc transmitting portion of the electrodes in the air stream in the area of oil vapor.

The invention will be clearly understood after reference to the following detailed specification read in conjunction with the drawings.

In the drawings, Figure 1 is a plan view of a forced air conduit of a conventional burner broken away to show the construction and the location therein of the oil supply pipe and nozzle.

Figure 2 is a sectional end view taken along the lines 2—2 of Figure 1.

Referring to the drawings, the numeral 10 designates the forced air conduit of a conventional oil burner. Rigidly mounted within the forced air conduit 10 is an oil supply pipe 11 provided with an oil ejecting nozzle 12 on its free end. The forced air conduit 10 and oil supply pipe 11 are well known parts of the standard oil burner and further reference to them is not thought necessary. They do not per se form a part of the present invention.

My invention relates to the pair of electrodes 13 and 14 and their location with respect to the forced air conduit 10 and the nozzle 12 of the oil supply pipe 11.

According to the invention the electrodes 13 and 14 are rigidly mounted within the forced air conduit 10. In the embodiment shown they are supported by insulators 15 and 16 held in brackets 17 and 18, carried by the oil supply pipe 11. These electrodes 13 and 14 approach each other to form an arc gap as at 19 and then separate from each other as at 20 to form an arc amplifying section and then extend in parallel relation to each other as at 21 towards their free ends. At their free ends they diverge sharply from each other as at 22 and 23. I will refer to the diverging portion 20 and the parallel portion 21 generally as the arc transmitting portions. The diverging free ends will be called arc extinguishing portions.

According to the invention electrodes 13 and 14 are mounted within the air conduit 10 to locate the arc gap 19 in an air stream which travels through the forced air conduit 10 in advance of the area of discharge of the nozzle 12 into the said air stream and to locate at least a portion of the arc transmitting portions of the electrodes in the area of discharge of the nozzle in the said air stream.

In use automatic control means in response to temperature conditions within the house being heated by the oil burner starts a stream of air through the air conduit 10 and a discharge of oil from the nozzle 12. At the same time a voltage is impressed across the electrodes 13 and 14 sufficiently high to cause an arc to jump across the arc gap 19. Once the arc is initiated it is blown along the electrodes towards their free ends by the current of air through the air conduit 10. As it travels along it is increased in length or amplified by the separating portions of the electrodes as at 20 and carried into the area where oil is injected into the air stream by the parallel sections of the electrodes 21. When the arc is blown to the diverging free ends of the electrodes 22 and 23 its length is sharply increased at a rapid rate until the resistance it must overcome becomes too great for the voltage maintaining it and it breaks. As soon as its breaks another arc is initiated across the arc gap 19 and is similarly amplified, carried to the combustion area, and extinguished by the sharply diverging free ends of the electrodes 22 and 23. The process is a repetitive one until combustion of the oil has been properly started. Automatic shutoff of the ignition then takes place.

I have not in the specification referred in any detail to the automatic means for starting the oil burner or the ignition system. This means is well known in the art and does not form a portion of this invention. The invention as indicated above relates solely to the formation and disposition of the electrodes 13 and 14.

By reason of the fact that the arc gap 19 is located out of the combustion area of the oil vapor and air it will not soot up when adjusted to a relatively small length. This permits the making of the gap 19 small whereby the burner can be ignited by impressing a relatively lower voltage across the electrodes 13 and 14. Before the arc is supplied to the combustion area though it is amplified by the amplifying section of the electrodes. It will further be noted that the arc is applied to a substantial area of the combustion zone and not only across two points. If desired the ends of the electrodes 22 and 23 can be formed other than sharply diverging as shown. They can, for example, be spaced a distance apart to maintain the arc across the gap for the duration of the ignition period. In this latter case, of course, the operation is somewhat different. The arc is established and preserved for the full ignition period. In the embodiment shown in the drawings a series of arcs travel along the electrodes in rapid succession. With each embodiment though the arc is struck across a narrow arc gap 19 located out of the combustion area of the oil vapour and sooting is avoided. At the same time low ignition voltage can be employed.

It will be appreciated that by combustion area I mean the area in any burner incorporating my invention where sooting would occur from combustion. With combustion there is considerable splattering of oil, and this splattering will travel rearwardly of the nozzle against the air stream. Some conventional burners have baffle means to limit it, others do not. I would however like to make it clear that the arc gap of my invention is located in the air stream in advance of any such effects no matter what design the particular burner in which it is used assumes.

From the above it will be apparent that I have disclosed an igniting electrode and a means for mounting it in an oil burner which achieves the objects of the invention. Embodiments of the invention other than the ones disclosed will be apparent to those skilled in the art and I only intend that my invention should be limited by the following claims:

What I claim as my invention is:

1. In an oil burner, a forced air conduit with an open discharge end and oil supply means having an outlet adapted to spray oil adjacent the discharge end of said conduit into an air stream forced through and out of the discharge end of said conduit, a pair of co-extensive spaced elongated electrodes rigidly mounted in side by side relation in said air conduit with their longitudinal axes extending longitudinally of said conduit and thereby in an air stream forced therethrough, said rigidly mounted electrodes being formed with portions directed towards each other to form an arc gap and then directed away from each other and then directed forwardly in closely spaced relation to a termination in free ends, the portions of said electrodes immediately adjacent their free ends diverging to break an arc thereacross, the portions of said electrodes between said diverging free end portions and said gap being arc transmitting portions and having a separation greater than said gap and less than said diverging free end portions but across which an arc initiated at said gap will extend, said electrodes being mounted with said arc gap portions thereof rearwardly of the outlet of said oil supply means and thereby out of the combustion area of oil spray and air, said arc transmitting portions extending in said air conduit from said arc gap forwardly to a position substantially immediately in front of the outlet of said oil supply means whereby the spark will be transmitted to a spray of oil from the outlet of said oil supply means.

2. An oil burner as claimed in claim 1 in which said electrode portions after they are directed away from each other as aforesaid extend towards their free ends in parallel spaced apart relation to each other to form said arc transmitting portions.

3. An oil burner as claimed in claim 1 in which said oil supply means includes an oil supply tube having a nozzle at its outlet, said tube being rigidly mounted within said conduit and with its longitudinal axis extending longitudinally thereof, said electrodes being rigidly mounted on but insulated from said oil supply tube.

DAVID L. NEWTON.

References Cited in the file of this patent

UNITED STATES PATENTS

| Number | Name | Date |
|---|---|---|
| 1,614,692 | Schroeder | Jan. 18, 1927 |
| 1,673,110 | Fogarty | June 12, 1928 |
| 1,762,555 | Kiefer | June 10, 1930 |
| 1,841,023 | Finke | Jan. 12, 1932 |
| 1,904,549 | Scognamillo | Apr. 18, 1933 |
| 2,129,472 | Lysholm | Sept. 6, 1933 |